(12) United States Patent
Suciu et al.

(10) Patent No.: US 10,167,723 B2
(45) Date of Patent: Jan. 1, 2019

(54) THERMALLY ISOLATED TURBINE SECTION FOR A GAS TURBINE ENGINE

(71) Applicant: United Technologies Corporation, Hartford, CT (US)

(72) Inventors: Gabriel L Suciu, Glastonbury, CT (US); Brian D Merry, Andover, CT (US); James D Hill, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 306 days.

(21) Appl. No.: 14/729,473

(22) Filed: Jun. 3, 2015

(65) Prior Publication Data
US 2015/0354455 A1 Dec. 10, 2015

Related U.S. Application Data

(60) Provisional application No. 62/008,760, filed on Jun. 6, 2014.

(51) Int. Cl.
| | |
|---|---|
| *F01D 5/08* | (2006.01) |
| *F02C 3/04* | (2006.01) |
| *F02C 3/14* | (2006.01) |
| *F01D 11/00* | (2006.01) |
| *F01D 11/02* | (2006.01) |
| *F01D 25/12* | (2006.01) |

(Continued)

(52) U.S. Cl.
CPC .............. *F01D 5/088* (2013.01); *F01D 5/08* (2013.01); *F01D 5/081* (2013.01); *F01D 5/082* (2013.01); *F01D 5/084* (2013.01); *F01D 5/085* (2013.01); *F01D 5/087* (2013.01); *F01D 11/001* (2013.01); *F01D 11/02* (2013.01); *F01D 25/12* (2013.01);
(Continued)

(58) Field of Classification Search
CPC ............ F01D 5/08–5/088; F01D 11/00; F01D 11/001; F01D 11/02; F01D 25/12; F05D 2260/231; F05D 2220/32; F02C 3/04; F02C 3/14; F02C 7/12; F02C 7/18; F02C 7/28
See application file for complete search history.

(56) References Cited

U.S. PATENT DOCUMENTS

2,988,325 A * 6/1961 Dawson ................. F01D 5/081
                                                           415/110
3,034,298 A    5/1962 White
(Continued)

FOREIGN PATENT DOCUMENTS

| EP | 0318026 | 5/1989 |
| JP | 2005506484 | 3/2005 |

OTHER PUBLICATIONS

Extended European Search Report for European Application No. 15170704.9 dated Oct. 30, 2015.

*Primary Examiner* — Scott Walthour
(74) *Attorney, Agent, or Firm* — Carlson, Gaskey & Olds, P.C.

(57) ABSTRACT

A gas turbine engine includes a turbine section fluidly connected to a combustor by a primary flow path. The turbine section includes a first portion at a high pressure relative to a second portion. A thermally isolated cooling plenum is positioned radially inward of the primary flow path. The cooling plenum is defined by a forward wall, a shaft structure, an aft wall, and an inner diameter wall of the primary flow path. Air in the thermally isolated cooling plenum is thermally isolated from air in the primary flow path. At least one cooling air system is operable to provide cooling air to the thermally isolated cooling plenum.

9 Claims, 3 Drawing Sheets

(51) Int. Cl.
  *F02C 7/12* (2006.01)
  *F02C 7/18* (2006.01)
  *F02C 7/28* (2006.01)

(52) U.S. Cl.
  CPC .................. *F02C 3/04* (2013.01); *F02C 3/14* (2013.01); *F02C 7/12* (2013.01); *F02C 7/18* (2013.01); *F01D 11/00* (2013.01); *F02C 7/28* (2013.01); *F05D 2220/32* (2013.01); *F05D 2260/231* (2013.01); *Y02T 50/676* (2013.01)

(56) References Cited

U.S. PATENT DOCUMENTS

| | | | |
|---|---|---|---|
| 4,425,079 A * | 1/1984 | Speak | F01D 5/081 415/115 |
| 4,708,588 A | 11/1987 | Schwarz et al. | |
| 4,815,272 A * | 3/1989 | Laurello | F01D 5/082 415/115 |
| 6,183,193 B1 | 2/2001 | Glasspoole et al. | |
| 6,837,676 B2 | 1/2005 | Yuri et al. | |
| 8,517,666 B2 | 8/2013 | Alvanos et al. | |
| 8,920,128 B2 | 12/2014 | Matwey et al. | |
| 9,920,652 B2 * | 3/2018 | Suciu | F01D 25/14 |
| 10,001,061 B2 * | 6/2018 | Suciu | F02C 7/18 |
| 2004/0219008 A1 * | 11/2004 | Judet | F01D 5/082 415/116 |
| 2005/0095122 A1 * | 5/2005 | Friedl | F01D 11/00 415/170.1 |
| 2007/0040335 A1 * | 2/2007 | Kowalczyk | F16J 15/442 277/412 |
| 2010/0158668 A1 | 6/2010 | Ottaviano et al. | |
| 2011/0217158 A1 | 9/2011 | Grissino et al. | |

* cited by examiner

THERMALLY ISOLATED TURBINE SECTION FOR A GAS TURBINE ENGINE

CROSS-REFERENCE TO RELATED APPLICATION

This application claims priority to U.S. Provisional Application No. 62/008,760 filed on Jun. 6, 2014.

TECHNICAL FIELD

The present disclosure relates generally to turbine cooling for a gas turbine engine, and more specifically to a thermally isolated cooling plenum in a gas turbine engine.

BACKGROUND

Gas turbine engines, such as those utilized in commercial aircraft, include a compressor section that compresses air and a combustor section that ignites combustion gasses mixed with the compressed air. The gasses generated by the combustion section are super-heated and expelled through a turbine section, driving the turbine section to rotate. Absent some form of cooling, the high temperatures of the expelled gasses can cause thermal degradation to occur in the turbine section.

To mitigate thermal degradation from the extreme temperatures, some or all of the turbine stages are actively cooled by passing relatively cool air through the turbine stage. The active cooling increases the life span of the components in the actively cooled turbine stage by reducing breakage resulting from thermal wear. In some example gas turbine engines, the relatively cool air is drawn from a bleed located in the compressor section (referred to as a compressor bleed) and is piped directly to the actively cooled turbine section through a tangential on board injection (TOBI) cooling system.

In practical gas turbine engine systems, air passing through a primary flow path of the turbine section is significantly hotter than air provided to the actively cooled region. Furthermore, in existing gas turbine engines a portion of the air in the primary flow path leaks into a cooling region radially inward of the primary flow path. As a result of the leakage, a temperature at a radially outermost edge of the cooling region is significantly hotter than a temperature at the radially innermost region resulting in a thermal gradient across the turbine stage.

Thermal gradients, such as those caused by the above described leakage, increase the stress on the components experiencing the thermal gradient and can lead to premature wear and/or breakage of the component.

SUMMARY OF THE INVENTION

In one exemplary embodiment, a gas turbine engine includes a compressor section, a combustor fluidly connected to the compressor section by a primary flow path, wherein the primary flow path is defined by an inner diameter flow path wall and an outer diameter flow path wall, a turbine section fluidly connected to the combustor by the primary flow path, wherein the turbine section includes a first portion and a second portion, the primary flow path through the first portion has a high pressure relative to the primary flow path through the second portion, a thermally isolated cooling plenum radially inward of the primary flow path, wherein the cooling plenum is defined by a forward wall, a shaft structure, an aft wall, and an inner diameter wall of the primary flow path, and wherein air in the thermally isolated cooling plenum is thermally isolated from air in the primary flow path, and at least one cooling air system operable to provide cooling air to the thermally isolated cooling plenum.

In a further exemplary embodiment of the above, the turbine section first portion includes at least one turbine stage, wherein a portion of the at least one turbine stage extends into the thermally isolated cooling plenum through the inner diameter flow path wall, and wherein an flow path inner diameter seal is disposed in the inner diameter flow path wall adjacent at least one of the at least one turbine stages, thereby preventing fluid transfer between the primary flow path and the thermally isolated cooling plenum through the inner diameter flow path wall.

In a further exemplary embodiment of any of the above, the turbine section first portion includes at least a first stage and a second stage, and wherein the flow path inner diameter seal is positioned between the first stage and the second stage along an axis defined by the primary flow path.

In a further exemplary embodiment of any of the above, the flow path inner diameter seal is a segmented seal.

A further exemplary embodiment of any of the above includes a fore seal disposed between the forward wall and a rotor structure, wherein the fore seal prevents fluid flow between the thermally isolated cooling plenum and an adjacent plenum.

In a further exemplary embodiment of any of the above, the fore seal is an axial non-contact seal.

A further exemplary embodiment of the above includes an aft seal disposed between the aft wall and a rotor structure, wherein the aft seal prevents fluid flow into the plenum.

In a further exemplary embodiment of any of the above, at least one cooling air system is a tangential on board injection (TOBI) system.

In a further exemplary embodiment of any of the above, at least one rotor in the first portion of the turbine section extends through the inner diameter flow path wall into the thermally isolated cooling plenum, and the at least one rotor comprises an internal cooling system operable to receive cooling air from the thermally isolated cooling plenum and expel spent cooling air into the primary flow path.

In another exemplary embodiment, a method for cooling at least one gas turbine engine stage includes providing a cooling airflow to a thermally isolated cooling plenum, distributing the cooling airflow throughout the thermally isolated cooling plenum, passing cooling air through at least one turbine stage extending into the plenum, thereby allowing the cooling airflow to exit the thermally isolated cooling plenum.

A further exemplary embodiment of any of the above includes preventing air from an adjacent plenum fore of the thermally isolated cooling plenum from entering the thermally isolated cooling plenum by at least disposing a first seal at a joint between a fore wall of the thermally isolated cooling plenum and a structure of a first rotor in the thermally isolated cooling plenum.

In a further exemplary embodiment of any of the above, the first rotor is a fore most rotor in the thermally isolated cooling plenum.

A further exemplary embodiment of any of the above includes air from an adjacent plenum aft of the thermally isolated cooling plenum from entering the thermally isolated cooling plenum by at least disposing a second seal at a joint between an aft wall of the thermally isolated cooling plenum and a structure of a second rotor in the thermally isolated cooling plenum.

In a further exemplary embodiment of any of the above, the second rotor is an aft most rotor in the thermally isolated cooling plenum.

A further exemplary embodiment of any of the above includes preventing air from a primary flow path from entering the thermally isolated cooling plenum by at least disposing a segmented seal in a portion of an inner diameter of the primary flow path defining the thermally isolated cooling plenum.

A further exemplary embodiment of any of the above includes disposing the segmented seal in a portion of the inner diameter of the primary flow path further comprises disposing the segmented seal between a first high pressure turbine stage and a second high pressure turbine stage.

In a further exemplary embodiment of any of the above distributing the cooling airflow throughout the thermally isolated cooling plenum comprises injecting the cooling airflow into the thermally isolated cooling plenum from a first source and allowing the cooling airflow to diffuse throughout the thermally isolated cooling plenum, thereby evenly distributing cooling air throughout the thermally isolated cooling plenum.

These and other features of the present invention can be best understood from the following specification and drawings, the following of which is a brief description.

DETAILED DESCRIPTION OF AN EMBODIMENT

Figure 1:
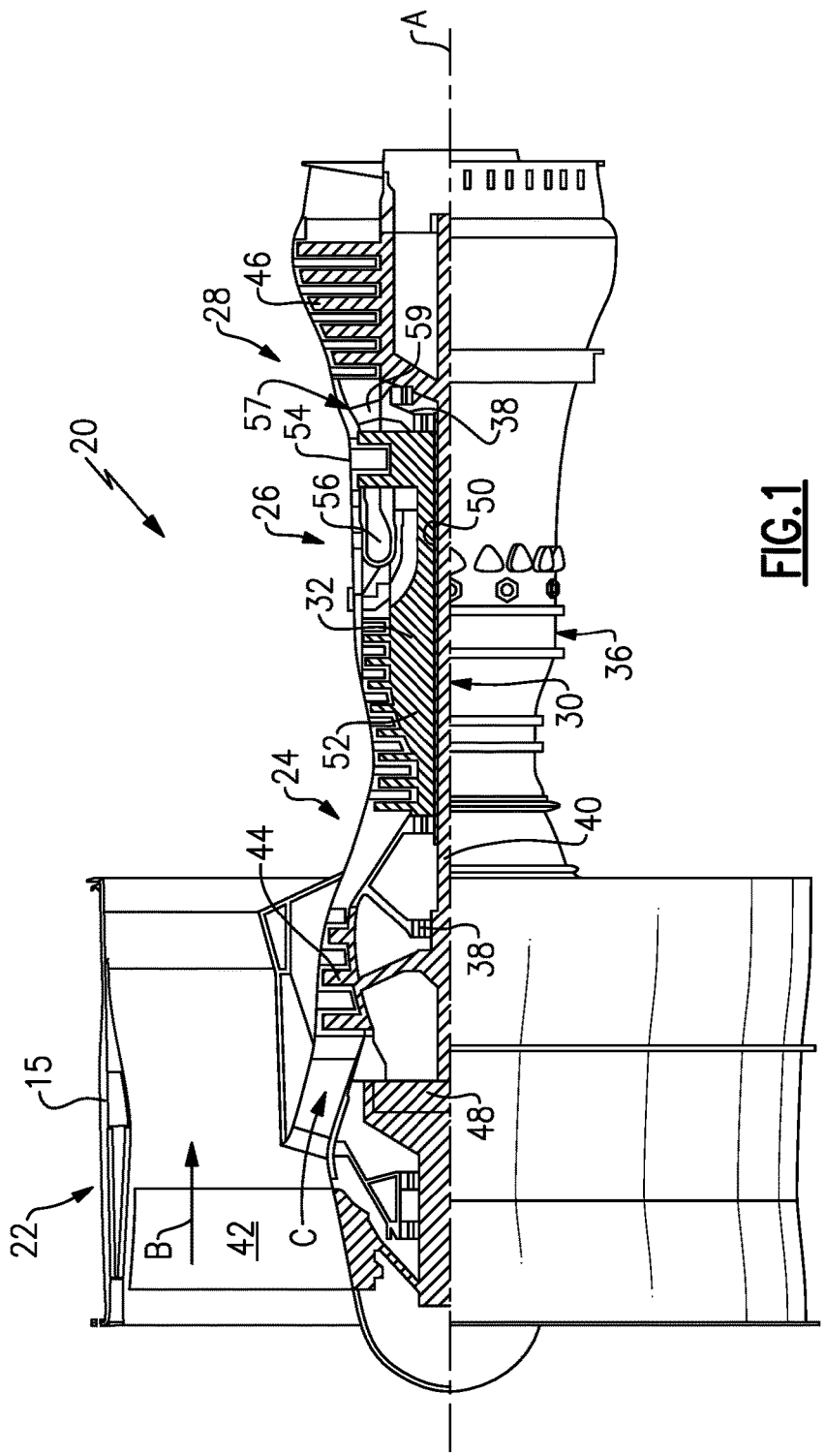
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° R)/(518.7° R)]0.5$. The "Low corrected fan tip speed" as disclosed herein according to one non-limiting embodiment is less than about 1150 ft/second.

Figure 2:
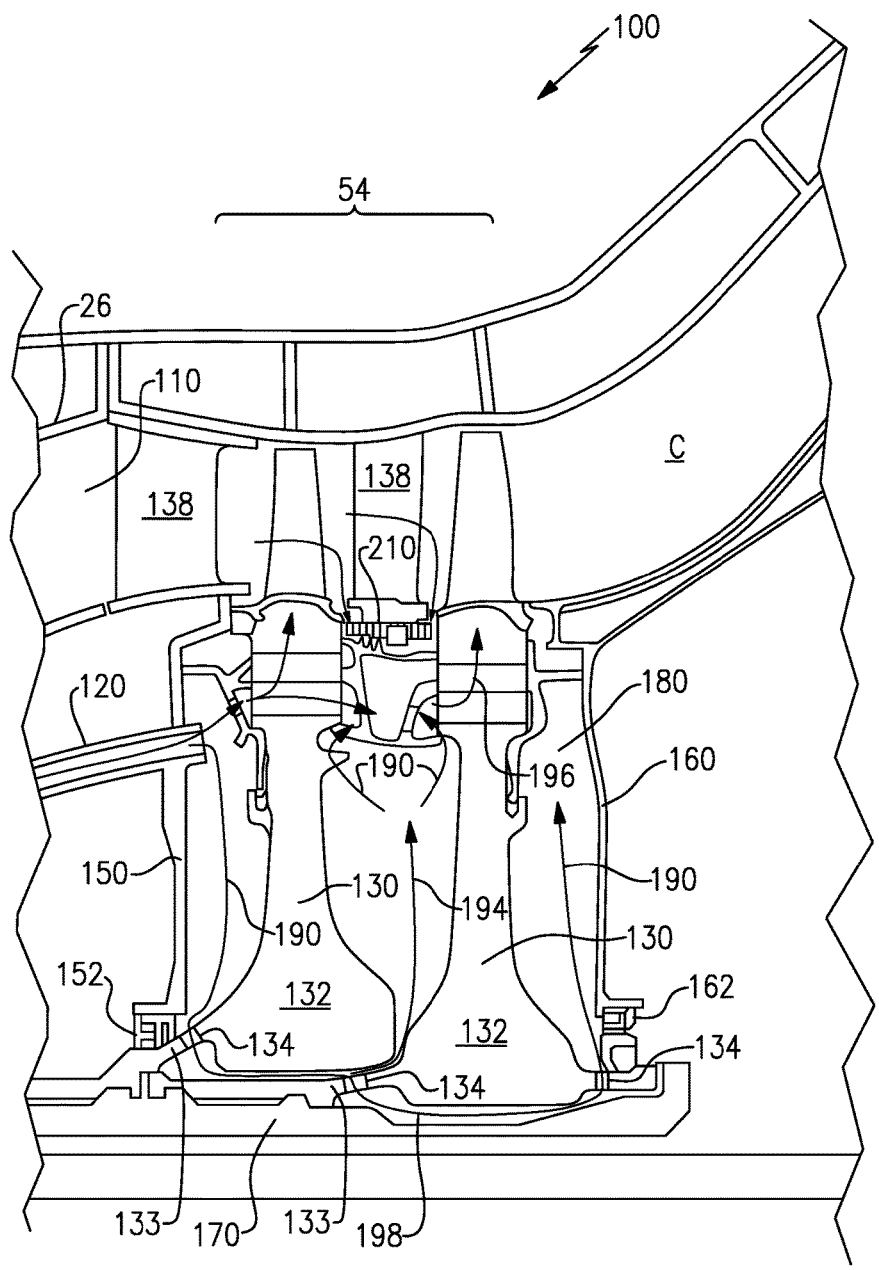
FIG. 2 schematically illustrates a section of a gas turbine engine.

FIG. 2 schematically illustrates a sectional view 100 of a portion of the gas turbine engine 20 of FIG. 1. Illustrated in the sectional view 100 is an aft portion of the combustor 26, the high pressure turbine section 54, and a portion of the primary flow path C connecting the high pressure turbine section 54 to the low pressure turbine section 46 (illustrated in FIG. 1) downstream of the high pressure turbine section 54.

The combustor 26 includes a combustor exit 110 that feeds combustion gasses into the primary flow path C of the high pressure turbine section 54. Disposed within the high pressure turbine section 54 are two rotors 130. Each rotor 130 is paired with an adjacent stator 138. Each rotor 130/stator 138 pairing is referred to as a turbine stage. In alternate examples, the high pressure turbine section 54 can include only a single stage, or more than two stages depending on the particular needs of the system. Each of the rotors 130 includes a root portion 132 that extends radially inward from the primary flowpath C into a thermally isolated cooling plenum 180. A flange 133 extends from each of the root portions 132.

In existing gas turbine engines, the portions of the rotors extending radially inward do not extend into a thermally isolated cooling plenum, but rather extend into a generally open plenum. In the existing turbine engine designs, cooling air is injected onto a portion of the foremost rotor from a first cooling source, such as a tangential on board injection (TOBI) system, while cooling air is provided to the aft side of the foremost rotor from another cooling air source, such as the compressor bleed. Finally, high pressure compressor cooling air is provided through the shaft structure and cools the aftmost side of the aftmost rotor in the high pressure turbine section. The cooling airflows from each of these sources are not isolated from other air sources within the gas turbine engine.

In addition to the cooling air flows and air from adjacent openings, air leaks from the primary flow path C into the generally open plenum. As a result of this leakage, as well as the different temperatures of the cooling air provided from the various cooling air sources, large thermal gradients can develop across the structure of the cooled rotors. As described above, the thermal gradients can increase wear on the turbine stages, and decrease the practical lifespan of the turbine stages.

Referring again to the illustrated example of FIG. 2, the thermally isolated cooling plenum 180 is an opening positioned radially inward of the primary flowpath C, radially inward of the high pressure turbine section 54. The air within the opening is thermally isolated from adjacent air by walls defining the thermally isolated cooling plenum 180. The thermally isolated cooling plenum 180 is defined by a forward wall 150, an aft wall 160, an inner diameter of the primary flowpath C, and a shaft structure 170. Each of the forward wall 150 and the aft wall 160 extends radially inward from the inner diameter of the primary flowpath C, and is sealed against the root portion 132 of a corresponding rotor 130. The forward wall 150 is sealed against a root portion 132 of the forward rotor 130 via a seal 152 (alternately referred to as a fore seal). Similarly, the aft wall 160 is sealed against a root portion 132 of the aft rotor 130 via a seal 162 (alternately referred to as an aft seal). The seals 152, 162 provide a barrier that prevents air from entering the thermally isolated cooling plenum 180 from the adjacent cavities that are at a higher pressure.

In the illustrated example, the seals 152, 162 are axial non-contact seals. Axial non-contact seals include inner shoes and an outer carrier. The outer carrier and the shoes are generally formed from a single piece of metal and are cut such that the combined seal is formed into segments. The cuts provide a gap that allow arms associated with the seal to provide a spring force. One example axial non-contact seal is described and illustrated in U.S. Published Patent Application 2013/0259660, which is hereby incorporated by reference. In alternate examples, any other suitable seal type can be utilized in place of the illustrated axial non-contact seals 152, 162.

The thermally isolated cooling plenum 180 receives a cooling air feed 190 from a tangential on board injection (TOBI) system. In alternate examples, the cooling air feed 190 can be provided by any gas turbine engine air system capable of providing an air feed of sufficiently high pressure to prevent backflow and sufficient temperature to cool the rotors 130. Due to the sealed nature of the thermally isolated cooling plenum 180, the only source of air entering the thermally isolated cooling plenum 180 is the cooling air feed 190.

In order to minimize thermal gradients the cooling air feed 190 from the TOBI 120 provides a cooling air feed 190 to the entire rotor portion 132 of each of the rotors 130. Further, the isolated nature of the thermally isolated cooling plenum 180 ensures that no hot airflows contact the root portions 132 of the rotors 130. As the cooling air feed 190 enters the thermally isolated cooling plenum 180, a portion of the cooling air feed 190 enters the rotor 130 near the inner diameter of the primary flow path C, and provides an internal cooling effect to the rotor according to known rotor cooling techniques. Another portion of the cooling air feed 190 branches radially inward and flows toward a shaft structure 170. The cooling air feed 190 passes through a flow path opening 134 in a portion of the root portion 132 and passes radially inward of the rotor 130 to an aft side of the rotor 130.

At the aft side of the rotor, the cooling air feed 190 again splits, with a portion flowing radially outward toward the inner diameter of the primary flow path C along a flow path 194 and a portion passing through another flow path opening 134 in the root portion 132 of the second rotor 130. The flow path 194 flows radially outward and cools both the aft side of the first rotor 130 and the fore side of the second rotor 130. A further portion of the air flowing through flow path 194 enters the second rotor 130 near the inner diameter of the primary flow path C along a flow path 196, and cools the inside of the second rotor 130 in a known manner.

A flow path 198 flows through the second flow path opening 134, passes underneath the root portion 132 of the second rotor 130, and flows radially outward toward the inner diameter of the primary flow path C. The flow path 198 provides cooling for the aft side of the second rotor 130. One of skill in the art, having the benefit of this disclosure, will understand that the arrangement illustrated in FIG. 2 can be modified to include multiple additional rotors 130 while still falling within the described invention.

In order to prevent air from the primary flow path C from entering the thermally isolated cooling plenum 180, a seal 210 is disposed along the inner diameter of the primary flow path C between the rotors 130. The seal 210 prevents air in the primary flow path C from leaking into the thermally isolated cooling plenum 180, thereby minimizing the occurrences of thermal gradients across the rotors 130. In the illustrated example the seal 210 is a segmented seal. In alternative examples, the seal 210 can be any seal type that adequately prevents air from passing from the primary flow path C into the thermally isolated cooling plenum 180.

Figure 3:
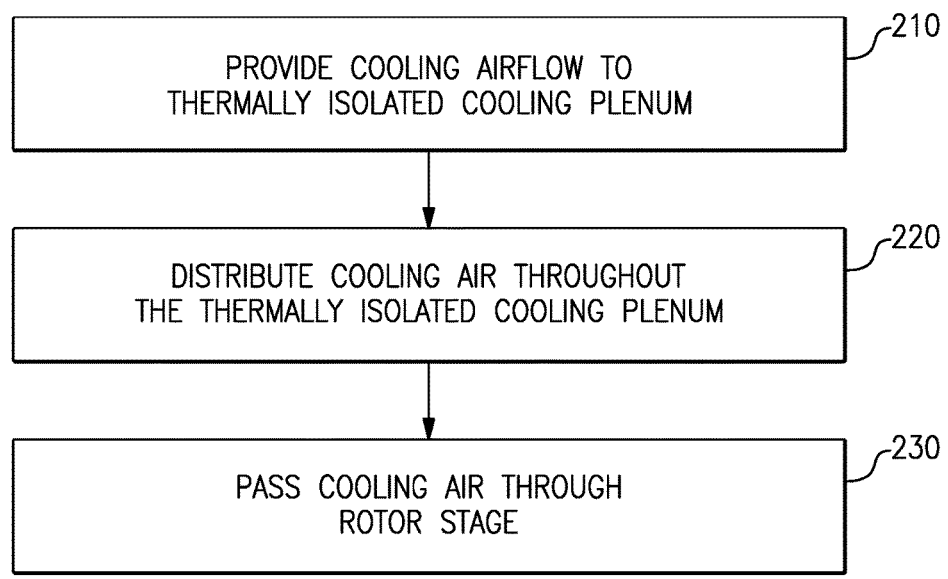
FIG. 3 is a flowchart illustrating a method for cooling high pressure turbine rotors.

FIG. 3 illustrates a flowchart 200 showing the steps of a method for cooling the stages in the high pressure compressor of FIG. 3. Initially, a cooling air feed 190 is provided to the thermally isolated cooling plenum 180 in a "Provide Cooling Airflow to Thermally Isolated Cooling Plenum" step 210. In the illustrated example of FIG. 2, the cooling airflow is from the TOBI 120 system. In alternate examples, the cooling airflow can originate from any other gas turbine engine system capable of providing an adequate volume of airflow that is cool enough to fully cool the rotors 130. In yet further alternate examples, multiple airflows originating from one or more gas turbine engine systems can be combined to form a single airflow with adequate volume and cooling capabilities. In such examples, the multiple airflows can be combined prior to entering the thermally isolated cooling plenum 180 or immediately after entering the thermally isolated cooling plenum 180.

Once the cooling air feed 190 has been provided to the thermally isolated cooling plenum 180, the cooling air is distributed throughout the thermally isolated cooling plenum 180 in a "Distribute Cooling Air throughout the Thermally Isolated Cooling Plenum" step 220. As a single source of cooling air is distributed throughout the entire thermally isolated cooling plenum, thermal gradients across the cooled rotors 130 are reduced and corresponding thermal wear is similarly reduced.

In order to prevent air from entering the thermally isolated cooling plenum 180 during this step, the aft and fore walls of the thermally isolated cooling plenum 180 are sealed to rotor structures to define the thermally isolated cooling plenum 180 as described above. Similarly, in order to prevent air from the primary flowpath from leaking into the thermally isolated cooling plenum, the inner diameter of the primary flowpath C is sealed using a segmented seal 210, as described above. The segmented seal 210 prevents air from the primary flowpath C form leaking into the thermally isolated cooling plenum 180, thereby maintaining the thermal isolation of the cooling plenum.

The cooling air distributed throughout the thermally isolated cooling plenum 180 enters at least one of the rotors 130 and provides an internal rotor cooling affect in a "Pass Cooling Air through Rotor Stage" step 230. The cooling air is then expelled into the primary flowpath C and exits the gas turbine engine 20 along the primary flowpath.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section;
a combustor fluidly connected to the compressor section by a primary flow path, wherein the primary flow path is defined by an inner diameter flow path wall and an outer diameter flow path wall;
a turbine section fluidly connected to the combustor by the primary flow path, wherein the turbine section includes a first portion and a second portion, the first portion having at least two turbine stages, each stage in the at least two turbine stages including a rotor, and the primary flow path through the first portion having a high pressure relative to a pressure of the primary flow path through the second portion during standard engine operations;
a cooling plenum radially inward of the primary flow path, wherein the cooling plenum is defined by a forward wall, a shaft, an aft wall, and the inner diameter flow path wall, and wherein air in the cooling plenum is substantially thermally isolated from air in the primary flow path;
a first rotor of the at least two turbine stages and a second rotor of the at least two turbine stages, the first rotor and the second rotor each extending radially into the cooling plenum, the first rotor comprising a first root portion and a first flange extending from the first root portion, the second rotor comprising a second root portion and a second flange extending from the second root portion, the first root portion positioned forward of the second root portion, the first flange, and the second flange including a second substantially radially aligned hole configured to allow fluid to pass through the second flange, wherein a portion of the second flange is positioned radially inward of the first rotor, and wherein a radial plane extends through the second substantially radially aligned hole and the first root portion of the first rotor, the radial plane being perpendicular to a longitudinal axis of the gas turbine engine;
a fore seal disposed between a radially inward end of said forward wall and the first rotor, wherein the fore seal is an axial non-contact seal;
an aft seal disposed between said aft wall and the second rotor, wherein said aft seal prevents fluid flow into said cooling plenum; and
a tangential on board injection system fluidly connected to the cooling plenum and configured to provide cooling air to a radially outward portion of a forward face of the first rotor such that cooling air provided by the tangential on board injection system to the cooling plenum flows from the radially outward portion of the forward face of the first rotor to a radially inward portion of the forward face of the first rotor.

2. The gas turbine engine of claim 1, wherein a flow path inner diameter seal is disposed in said inner diameter flow path wall adjacent to at least one of said at least two turbine stages, thereby preventing fluid transfer between the primary flow path and the cooling plenum through said inner diameter flow path wall.

3. The gas turbine engine of claim 2, wherein said flow path inner diameter seal is positioned between said first rotor and said second rotor in an axial direction, with respect to the longitudinal axis of the gas turbine engine.

4. The gas turbine engine of claim 3, wherein said flow path inner diameter seal is a segmented seal.

5. The gas turbine engine of claim 1, wherein said fore seal prevents fluid flow between said cooling plenum and an adjacent plenum.

6. The gas turbine engine of claim 1, wherein at least one of said first rotor and said second rotor comprises an internal cooling system fluidly connected to said cooling plenum.

7. The gas turbine engine of claim 6, wherein the aft seal contacts a radially inward end of the aft wall.

8. The gas turbine engine of claim 1, wherein the fore seal is disposed between the forward wall and the first flange.

9. The gas turbine engine of claim 1, wherein the radially inward end is a radially innermost end of the forward wall.

* * * * *